US012770257B2

(12) United States Patent
Seo et al.

(10) Patent No.: US 12,770,257 B2
(45) Date of Patent: Oct. 20, 2026

(54) APPARATUS FOR ANALYZING NATURAL KILLER CELL ACTIVITY USING LENS-FREE SHADOW IMAGING TECHNIQUE, AND METHOD THEREFOR

(71) Applicant: METAIMMUNETECH INC, Sejong (KR)

(72) Inventors: Sungkyu Seo, Sejong-si (KR); A-hyeon Lee, Sejong-si (KR); Inha Lee, Sejong-si (KR)

(73) Assignee: METAIMMUNETECH INC., Sejong (KR)

( * ) Notice: Subject to any disclaimer, the term of this patent is extended or adjusted under 35 U.S.C. 154(b) by 263 days.

(21) Appl. No.: 18/693,021

(22) PCT Filed: Jun. 13, 2022

(86) PCT No.: PCT/KR2022/008302
§ 371 (c)(1),
(2) Date: Mar. 18, 2024

(87) PCT Pub. No.: WO2023/042999
PCT Pub. Date: Mar. 23, 2023

(65) Prior Publication Data

US 2025/0131557 A1 Apr. 24, 2025

(30) Foreign Application Priority Data

Sep. 17, 2021 (KR) ........................ 10-2021-0124875
Oct. 13, 2021 (KR) ........................ 10-2021-0135967

(51) Int. Cl.
*G06T 7/00* (2017.01)

(52) U.S. Cl.
CPC .. *G06T 7/0012* (2013.01); *G06T 2207/10056* (2013.01); *G06T 2207/30024* (2013.01)

(58) Field of Classification Search
CPC ........................................................ G06T 7/73
See application file for complete search history.

(56) References Cited

U.S. PATENT DOCUMENTS

2021/0041418 A1* 2/2021 Wang ........................ C12N 1/06
2022/0012879 A1* 1/2022 De Poly ............... A61B 5/0066
2022/0170842 A1* 6/2022 Lee .................... G01N 15/1433

FOREIGN PATENT DOCUMENTS

CN 108693115 A 10/2018
CN 112301086 A 2/2021
(Continued)

OTHER PUBLICATIONS

Geonsoo, Lens-free shadow image based high-throughput continuous cell monitoring technique (2012).*
(Continued)

*Primary Examiner* — Di Xiao
(74) *Attorney, Agent, or Firm* — Leber IP Law

(57) ABSTRACT

Various embodiments provide an apparatus for analyzing natural killer (NK) cell activity using a lens-free shadow imaging technique and a method therefor. The apparatus for analyzing NK cell activity according to various embodiments has a dedicated algorithm configured to analyze the activity of NK cells on the basis of a lens-free shadow image of the NK cells. According to various embodiments, the dedicated algorithm detects at least one shadow parameter from at least a partial region of the lens-free shadow image, and uses the shadow parameter to analyze the activity of the NK cells. The shadow parameters include at least one of the peak-to-peak distances (PPD) indicating the distances between peaks in the region, the width of secondary maxima (WSM) indicating the width of the maximum brightness in the region, the standard deviation of the WSM (WSM_SD) indicating the standard deviation of the WSM, or the minima
(Continued)

of the WSM (WSM_Min) indicating the minimum value of the WSM.

9 Claims, 18 Drawing Sheets

(56) References Cited

FOREIGN PATENT DOCUMENTS

| | | | | |
|---|---|---|---|---|
| KR | 1020110129078 | A | 12/2011 | |
| KR | 101483883 | B1 | 1/2015 | |
| WO | WO-2020205998 | A1 * | 10/2020 | ......... G01N 21/8851 |

OTHER PUBLICATIONS

Roy et al., "A simple and low-cost device performing blood cell counting based on lens-free shadow imaging technique", Sensors and Actuators B; Chemical, May 14, 2014, vol. 201, pp. 321-328.

International Application No. PCT/KR2022/008302, International Search Report mailed Oct. 5, 2022, 3 pages.

* cited by examiner

| [Shadow Image] PPD * WSM_SD | 6h | 12h | 24h |
|---|---|---|---|
| Control (STD) | 151.7 (3.50) | 158.1 (9.98) | 170.7 (15.6) |
| IL-2/IL-12 (STD) | 184.0 (9.32) | 316.9 (6.91) | 202.5 (33.3) |
| Difference (STD) | 32.3 (9.32) | 158.8 (6.91) | 31.8 (33.3) |

| [Shadow Image] PPD * WSM_SD | 6h | 12h | 24h |
|---|---|---|---|
| Control (STD) | 137.0 (14.8) | 122.3 (3.78) | 119.3 (17.0) |
| IL-2/IL-12 (STD) | 207.4 (13.1) | 189.1 (6.20) | 151.2 (7.32) |
| Difference (STD) | 70.4 (13.1) | 66.8 (6.20) | 31.9 (7.32) |

| [Shadow Image] PPD * WSM_SD | 6h | 12h | 24h |
|---|---|---|---|
| Control (STD) | 126.4 (8.88) | 151.7 (15.6) | 141.9 (6.34) |
| IL-2/IL-12 (STD) | 160.2 (7.60) | 224.9 (17.7) | 157.4 (16.9) |
| Difference (STD) | 33.8 (7.60) | 73.2 (17.7) | 15.5 (16.9) |

| [ELISA] Increased IFN-γ | 0h~6h | 6h~12h | 12h~24h |
|---|---|---|---|
| IL-2/IL-12 (pg/ml) | 3052 | 16400 | -4923 |

| [ELISA] Increased IFN - γ | 0h~6h | 6h~12h | 12h~24h |
|---|---|---|---|
| IL-2/IL-12 (pg/ml) | 4607 | 3619 | 3024 |

| [ELISA] Increased IFN-γ | 0h~6h | 6h~12h | 12h~24h |
|---|---|---|---|
| IL-2/IL-12 (pg/ml) | 2608 | 21677 | 15844 |

APPARATUS FOR ANALYZING NATURAL KILLER CELL ACTIVITY USING LENS-FREE SHADOW IMAGING TECHNIQUE, AND METHOD THEREFOR

RELATED APPLICATIONS

This application is a national phase entry of International Patent Application No. PCT/KR2022/008302, filed Jun. 13, 2022, which claims priority from Korean Patent Application No. 10-2021-0124875 filed, Sep. 17, 2021, and Korean Patent Application No. 10-2021-0135967 filed Oct. 13, 2021, the entire disclosures of which are incorporated herein by reference.

TECHNICAL FIELD

Various embodiments relate to a technology which measures morphological changes in cells according to a change in the activity of natural killer (NK) cells by using a lens-free shadow imaging technique and applies the morphological change to immunity diagnosis, and more particularly, to an apparatus for analyzing the activity of NK cells by using a lens-free shadow imaging technique for rapidly recognizing and quantizing morphological changes in cells, which occurs when an NK cell is activated, and including a CMOS image sensor, an LED, a cell chip, and a dedicated algorithm, and a method using the same.

BACKGROUND ART

The human body includes an immune system for protecting the human body against microorganisms, viruses, and other external substances. The immune system is typically divided into innate immunity and adaptive immunity. Among them, the innate immunity refers to marrow cells and lymph cells that are widely distributed and can perform a quick and immediate response, and means the first line of defense of the human body. Constituent components that are responsible for the innate immunity maintain the state in which the innate immunity can be rapidly activated in order to induce a quicker and immediate response. In particular, a natural killer cell (hereinafter referred to as an “NK cell”), that is, one of immunocytes that play an important role in the innate immunity system, can rapidly induce an immune reaction against several antigens, such as viruses and bacteria, without antigenic specificity or anamnesis.

The NK cell is killer lymphocyte that belongs to a lower group of a white blood cell and has the cytotoxic ability. About 10 to 15% of NK cells are present in blood within the body. The NK cell maturates in liver, spleen, bone marrow, etc. and enters the circulatory system. The NK cell manifests various activated receptors and suppressed receptors. Accordingly, the activity of the NK cell is adjusted and an abnormal cell is removed, without a specific antigens stimulus by using the activated receptors and suppressed receptors. The NK cell has a suppressed receptor which may be specifically combined with Major Histocompatibility Complex (MHC) class I that has been manifested on a surface of a normal cell. In the case of a tumor cell or an infected abnormal cell, the manifestation of the MHC class I is significantly low or deficient. Accordingly, the NK cell plays an important role in immunity in which an abnormal cell is recognized and removed by secreting protein, such as perforin or grenzeim in order to induce the cell apoptosis of the abnormal cell. Furthermore, it has been reported that the NK cell may be activated and has improved cell proliferation, differentiation, and cytotoxic abilities by the influence of several cytokine, such as IL-2, IL-12, IL-15, and IL-18. It has been known that an activated NK cell secretes interferon-gamma (IFN-γ), interferon-alpha (TNF-α), etc. and mediates adaptive immunity in conjunction with other immunocytes.

Several researches in which when the NK cell that plays an important role in the immune system is activated as described above, morphological changes, such as the size of the NK cell and the complexity of granules thereof, appear are widely reported. In order for the NK cell to induce an immunity response with respect to an abnormal cell or several other antigens, the NK cell needs to be activated. The activity of NK cells may be considered as a major immunity index of the human body, which indicates the ability to kill an abnormal cell and the ability to resist external antigens. This means that the number of NK cells is important in the immune system, but the activity of each of NK cells is more important. Accordingly, research is carried out in various forms, such as the enhancement of the activation of an NK cell and an activated NK cell medicine.

Today, an immunity diagnostic kit that is mostly widely used in Korea is NK Vue kit, that is, an NK cell activity diagnostic kit that was developed by NKMAX. NK Vue kit diagnoses the activity of an NK cell by gathering whole blood 1 ml, artificially processing an NK cell activation-inducing material, and then measuring IFN-γ that is secreted by using Enzyme Linked ImmunoSorbent Assay (ELISA) after 24 hours. NK Vue kit provides the activity of an NK cell in a way to quantize the amount of IFN-γ by using the ELISA, based on research results in which a defect was present in the function of an NK cell in patients who had various types of cancer and research results in which the activity of NK cells in actual cancer patients was very lower than the activity of NK cells in normal persons, and also presents a new cancer diagnosis method through the activity of NK cells.

DISCLOSURE

Technical Problem

Various embodiments propose a new technology capable of rapidly diagnosing the activity of an NK cell even without using the ELISA scheme that essentially requires an expert and that requires a lot of time and costs, by easily analyzing morphological changes (the size of cytoplasm, the complexity of granules, etc.) inside and outside the NK cell, which occurs when the NK cell is activated, through a lens-free shadow imaging technique (LSIT) platform to which a dedicated algorithm has been applied.

Technical Solution

Various embodiments provide an apparatus and method for analyzing the activity of NK cells by using a lens-free shadow imaging technique.

An apparatus for analyzing the activity of NK cells according to various embodiments includes a cell chip in which an NK cell is disposed, an LED configured to radiate light to the NK cell, a CMOS image sensor configured to photograph a lens-free shadow image of the NK cell, and a processor including a dedicated algorithm configured to analyze the activity of the NK cell based on the lens-free shadow image.

According to various embodiments, the dedicated algorithm detects at least one shadow parameter in at least some region of the lens-free shadow image and analyzes the activity of the NK cell by using the shadow parameter. The shadow parameter includes at least one of a peak-to-peak distance (PPD) indicative of a distance between peaks in the region, the width of secondary maxima (WSM) indicative of the width having maximum brightness in the region, a standard deviation of WSM (WSM_SD) indicative of a standard deviation of the WSM, or minima of WSM (WSM-_Min) indicative of a minimum value of the WSM.

A method of the apparatus for analyzing the activity of NK cells according to various embodiments includes detecting at least one shadow parameter in at least some region of a lens-free shadow image of an NK cell, and analyzing the activity of the NK cell by using the shadow parameter.

According to various embodiments, the shadow parameter includes at least one of a peak-to-peak distance (PPD) indicative of a distance between peaks in the region, the width of secondary maxima (WSM) indicative of the width having maximum brightness in the region, a standard deviation of WSM (WSM_SD) indicative of a standard deviation of the WSM, or minima of WSM (WSM_Min) indicative of a minimum value of the WSM.

Advantageous Effects

According to various embodiments, an ordinary person can provide immunity diagnosis information by quantizing the activity of an NK cell rapidly and cheaply through an NK cell-dedicated algorithm that is responsible for detecting morphological changes in cells even without using the existing method that requires an expert and a lot of time and costs, such as ELISA, by using the lens-free shadow imaging technique. In particular, various embodiments may enable patient-customized immunity diagnosis because information on the number of NK cells or the activity of each NK cell, which are not possible through the existing technique, can be provided.

MODE FOR DISCLOSURE

Hereinafter, various embodiments of this document are described with reference to the accompanying drawings.

Various embodiments relate to a technology which measures morphological changes in cells according to a change in the activity of natural killer (NK) cells by using a lens-free shadow imaging technique and applies the morphological change to immunity diagnosis, and more particularly, to an apparatus for analyzing the activity of NK cells by using a lens-free shadow imaging technique for rapidly recognizing and quantizing morphological changes in cells, which occurs when an NK cell is activated, and including a complementary metal-oxide semiconductor (CMOS) image sensor, a light-emitting diode (LED), a cell chip, and a dedicated algorithm, and a method using the same.

Various embodiments provide a technology capable of diagnosing immunity cheaply and rapidly without the help of an expert by constructing a technology capable of measuring a characteristic in which a form of an NK cell is changed when the NK cell is activated through the lens-free shadow imaging technique and measuring the activity of the NK cell based on the characteristic.

Figure 1:
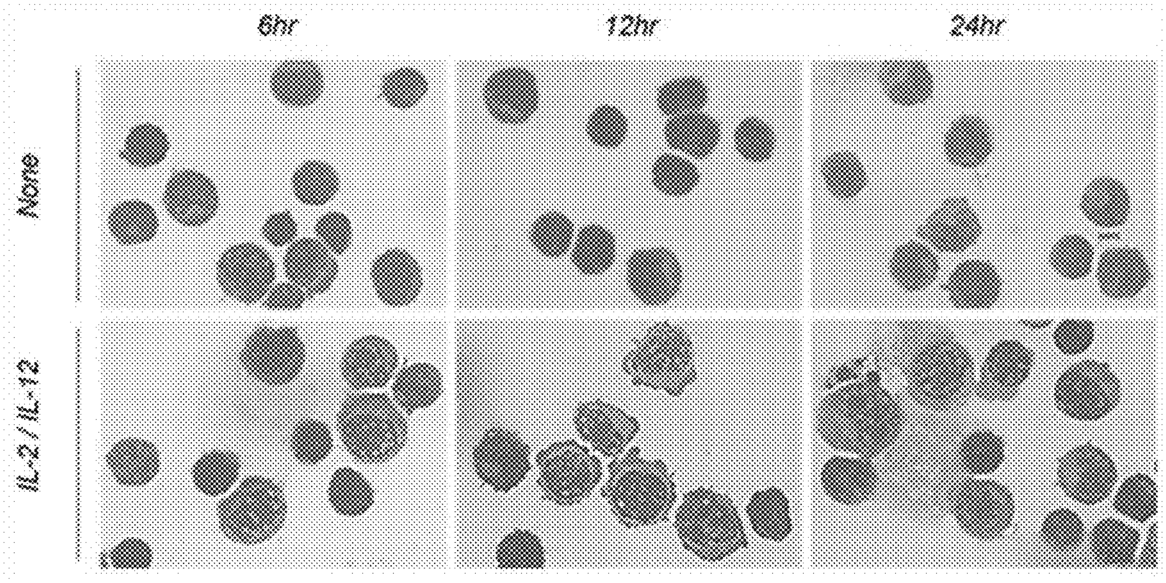
FIG. 1 is a microscopic image illustrating morphological changes in NK cells.

FIG. 1 is a microscopic image illustrating morphological changes in NK cells.

Referring to FIG. 1, in order to monitor morphological changes which occur when an NK cell that is obtained from peripheral blood of a person is activated, morphological changes of an NK cell for which activation has not been induced and an NK cell for which activation has been induced over time were monitored. To this end, an NK-92 cell was cultivated in a condition including 37° C. and 5% $CO_2$ by mixing 12.5% fetal bovine serum, 12.5% equine serum, 1% penicillin/streptomycin, 0.2 mM myoinositol, 0.02 mM folic acid, 0.1 nM β-mercaptoethanol, and recombinant human IL-2 having a proper concentration in an α-MEM medium. Furthermore, after the activation of the NK-92 cell was induced by processing recombinant human IL-2 and IL-12 having a proper concentration, the NK-92 cell was cultivated until 24 hours. It was monitored that as the results of monitoring the NK-92 cell after dyeing the NK-92 cell through a hema 3 dyeing method every 6, 12, and 24 hours, cytoplasm was changed and the size of the NK-92 cell was increased in an NK cell for which activation was induced compared to an NK cell for which activation was not induced and cytoplasm was more changed and the size of the NK-92 cell was more increased in 12 and 24 hours than in 6 hours, as illustrated in FIG. 1.

Figure 2:
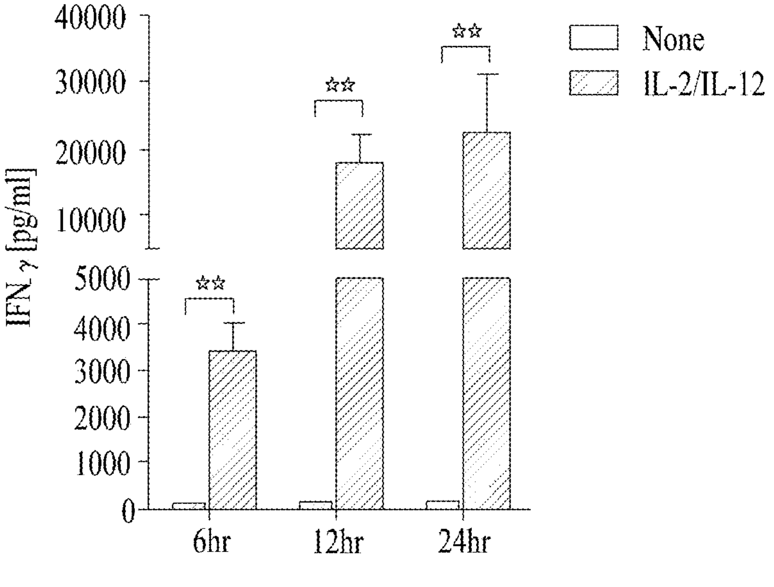
FIG. 2 is a graph illustrating the results of measurement of the activity of an NK cell through the existing measurement method.

FIG. 2 is a graph illustrating the results of measurement of the activity of an NK cell through the existing measurement method.

Referring to FIG. 2, the activity of an NK cell was analyzed through ELISA, that is, the existing measurement method. To this end, an NK-92 cell was cultivated in a condition having 37° C. and 5% $CO_2$ by mixing 12.5% fetal bovine serum, 12.5% equine serum, 1% penicillin/streptomycin, 0.2 mM myoinositol, 0.02 mM folic acid, 0.1 mM β-mercaptoethanol, and recombinant human IL-2 in an α-MEM medium. Furthermore, after the activation of the NK-92 cell was induced by processing recombinant human IL-2 to IL-12 having a proper concentration, the NK-92 cell was cultivated until 24 hours. After the induction of the activation, the NK-92 cell and the medium were separated through centrifugation every 6, 12, and 24 hours, and a supernatant was obtained. It was checked that as the results of measuring IFN-γ that was present in the supernatant through ELISA, the amount of secretion of IFN-γ was suddenly increased over time after the activation and the amount of secretion of IFN-γ for each time was the greatest in 6 to 12 hours, as illustrated in FIG. 2.

Figure 3:
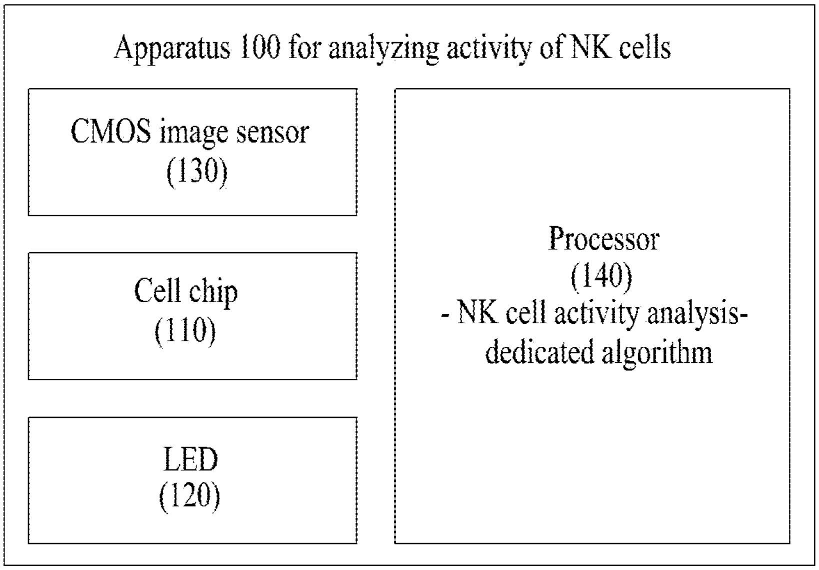
FIG. 3 is a block diagram schematically illustrating an apparatus for analyzing the activity of NK cells according to various embodiments.
Figure 4A:
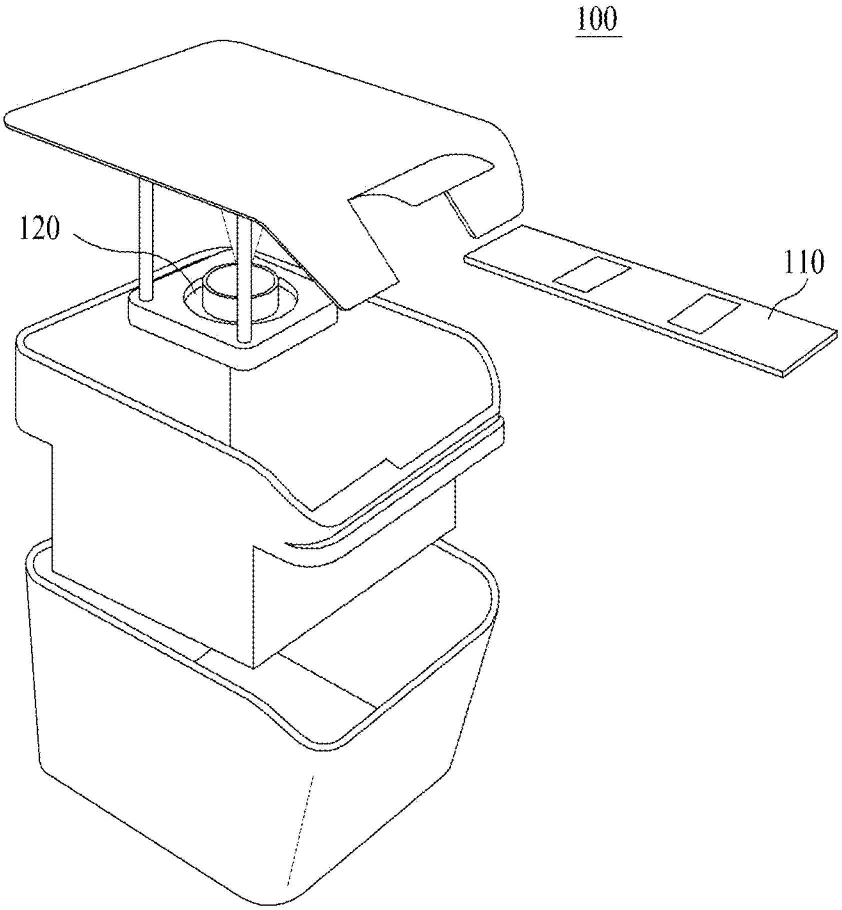
FIG. 4A is a plane perspective view exemplarily illustrating the apparatus for analyzing the activity of NK cells in FIG. 3.
Figure 4B:
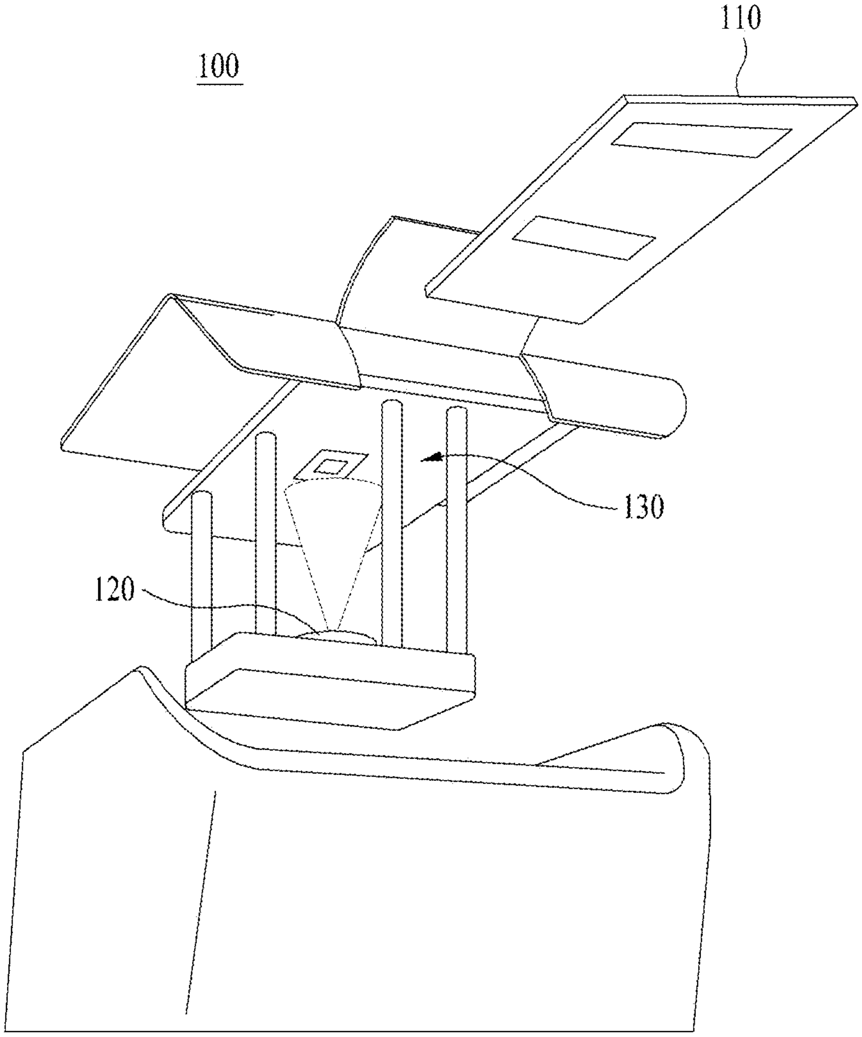
FIG. 4B is a bottom perspective view exemplarily illustrating the apparatus for analyzing the activity of NK cells in FIG. 3.
Figure 4C:
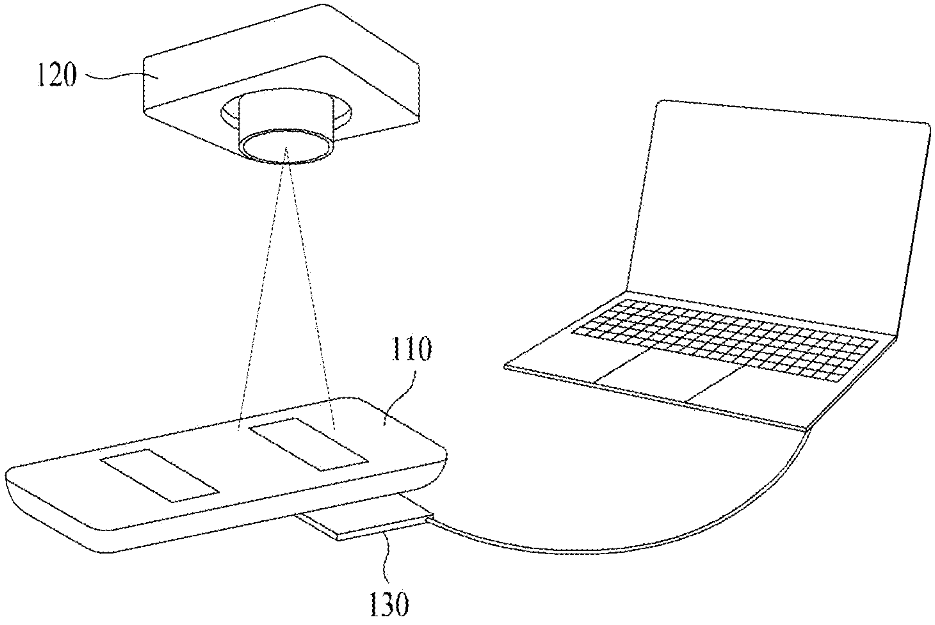
FIG. 4C is a perspective view exemplarily illustrating the relation of arrangement between a cell chip, an LED, a CMOS image sensor, and a processor in FIGS. 4A and 4B.

FIG. 3 is a block diagram schematically illustrating an apparatus 100 for analyzing the activity of NK cells according to various embodiments. FIG. 4A is a plane perspective view exemplarily illustrating the apparatus 100 for analyzing the activity of NK cells in FIG. 3. FIG. 4B is a bottom perspective view exemplarily illustrating the apparatus 100 for analyzing the activity of NK cells in FIG. 3. FIG. 4C is a perspective view exemplarily illustrating the relation of arrangement between a cell chip 110, an LED 120, a CMOS image sensor 130, and a processor 140 in FIGS. 4A and 4B.

Referring to FIG. 3, the apparatus 100 for analyzing the activity of NK cells evaluates and analyzes the activity of an NK cell by analyzing the NK cell based on a lens-free shadow imaging technique. Accordingly, the apparatus 100 for analyzing the activity of NK cells may diagnose immunity cheaply and rapidly without the help of an expert. Specifically, the apparatus 100 for analyzing the activity of NK cells is implemented as a lens-free shadow imaging system as illustrated in FIGS. 4A, 4B, and 4C. The apparatus 100 or analyzing the activity of an NK cell includes the cell chip 110, the LED 120, the CMOS image sensor 130, and the processor 140.

The cell chip 110 is configured to dispose an NK cell. In this case, the NK cell may have been activated under a specific condition. Specifically, the cell chip 110 provides a space for the NK cell. According to an embodiment, the cell chip 110 includes an upper substrate and a lower substrate. The upper substrate and the lower substrate are bonded or assembled with the space for the NK cell interposed therebetween. For example, the cell chip 110 is fabricated by at least one of glass, plastic, or a polymer material.

The LED 120 is configured to radiate light to an NK cell. Specifically, the LED 120 is disposed by being spaced apart from the cell chip 110, and radiates light to the NK cell disposed in the cell chip 110. In this case, the LED 120 has a micro pinhole. The pinhole is provided to enhance coherence and illuminance of the light that is generated by the LED 120.

The CMOS image sensor 130 is configured to photograph a lens-free shadow image of NK cells. Specifically, the CMOS image sensor 130 photographs the lens-free shadow image of the NK cell that is disposed in the cell chip 110 as the LED 120 radiates light to the cell chip 110. To this end, the CMOS image sensor 130 is disposed on a side opposite to the LED 120 with the cell chip 110 interposed therebetween. According to an embodiment, as illustrated in FIGS. 4A, 4B, and 4C, the LED 120 may be disposed over the cell chip 110, and the CMOS image sensor 130 may be disposed under the cell chip 110. According to another embodiment, although not illustrated, the LED 120 may be disposed under the cell chip 110, and the CMOS image sensor 130 may be disposed over the cell chip 110.

The processor 140 analyzes the activity of an NK cell based on a lens-free shadow image of the NK cell. In this case, the processor 140 may be implemented as an internal module of the apparatus 100 for analyzing the activity of NK cells or may be implemented as an external module that is connected to a component within the apparatus 100 for analyzing the activity of NK cells as illustrated in FIG. 4*c*. Specifically, the processor 140 has an NK cell activity analysis-dedicated algorithm. The NK cell activity analysis-dedicated algorithm calculates a predetermined at least one shadow parameter from the lens-free shadow image, and analyzes the activity of the NK cell by using the calculated shadow parameter. In this case, the NK cell activity analysis-dedicated algorithm analyzes whether the NK cell has been activated or a degree of the activity of the NK cell.

According to various embodiments, the apparatus 100 for analyzing the activity of NK cells is implemented as the lens-free shadow imaging system, and does not require a separate focus acquisition process by using the CMOS image sensor 130 from which a lens has been removed and the LED 120 having a specific wavelength and having a micro pinhole mounted thereon, instead of any optical lens and an expensive lamp light source unlike the existing optical microscope.

Figure 5:
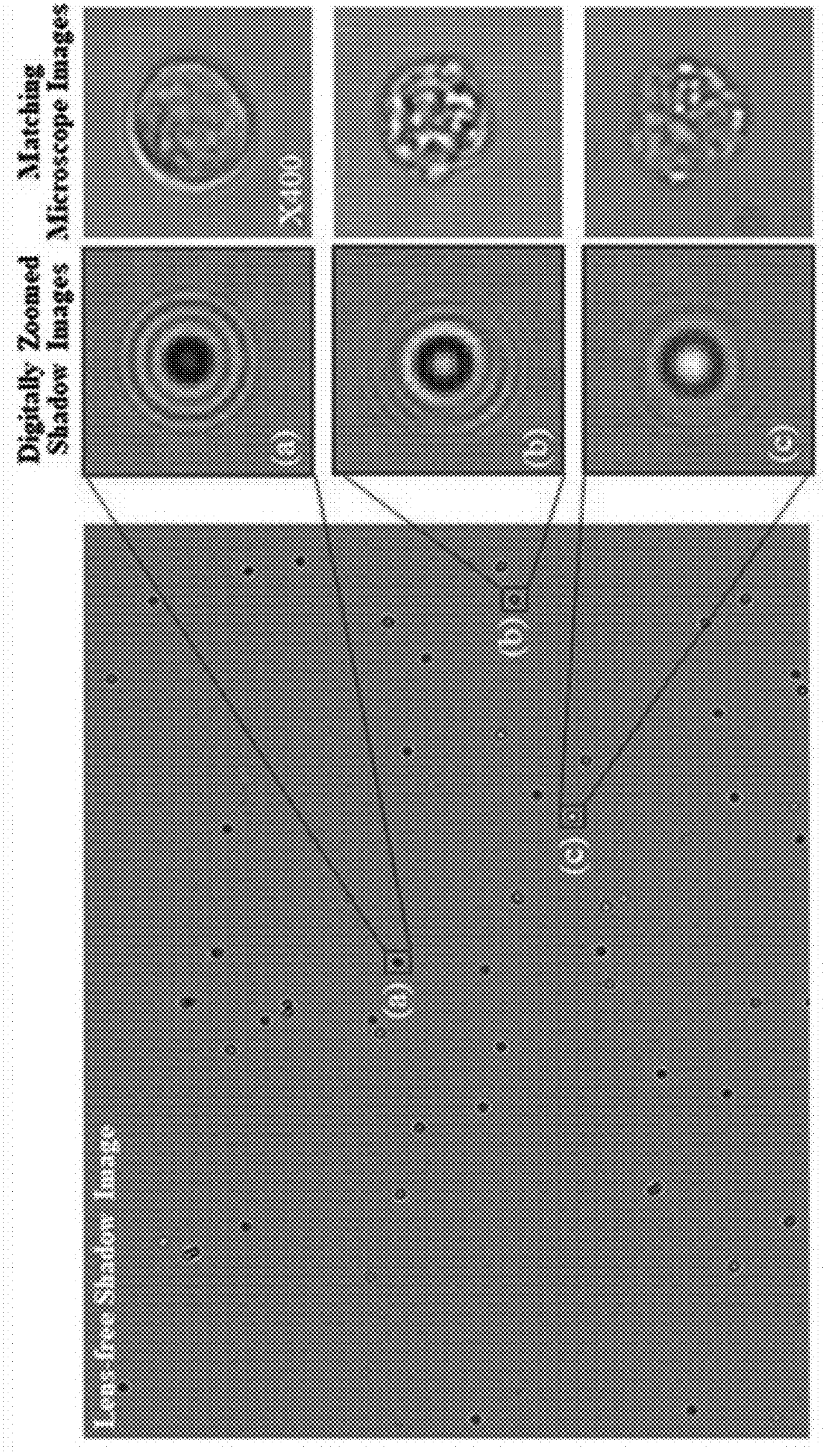
FIG. 5 is a lens-free shadow image of NK cells, which was photographed by the apparatus for analyzing the activity of NK cells according to various embodiments and a microscopic image of NK cells for being compared with the lens-free shadow image.

FIG. 5 is a lens-free shadow image of NK cells, which was photographed by the apparatus 100 for analyzing the activity of NK cells according to various embodiments and a microscopic image of NK cells for being compared with the lens-free shadow image.

Referring to FIG. 5, the apparatus 100 for analyzing the activity of NK cells has a much wide field-of-view (FOV) compared to a microscope that uses an optical lens because the apparatus is implemented as the lens-free shadow imaging system and does not use the existing optical lens for increasing spatial resolution. Accordingly, the apparatus 100 for analyzing the activity of NK cells may photograph a large number of NK cells as one sheet of a lens-free shadow image, and may analyze a large number of NK cells based on the one sheet of the lens-free shadow image. (a), (b), and (c) in FIG. 5 are a lens-free shadow image that has been obtained by enlarging NK cells in some region of the lens-free shadow image through digital zoom. Images of corresponding NK cells, which were photographed by the existing optical microscope having 10 magnifications, are presented on the right side.

Figure 6:
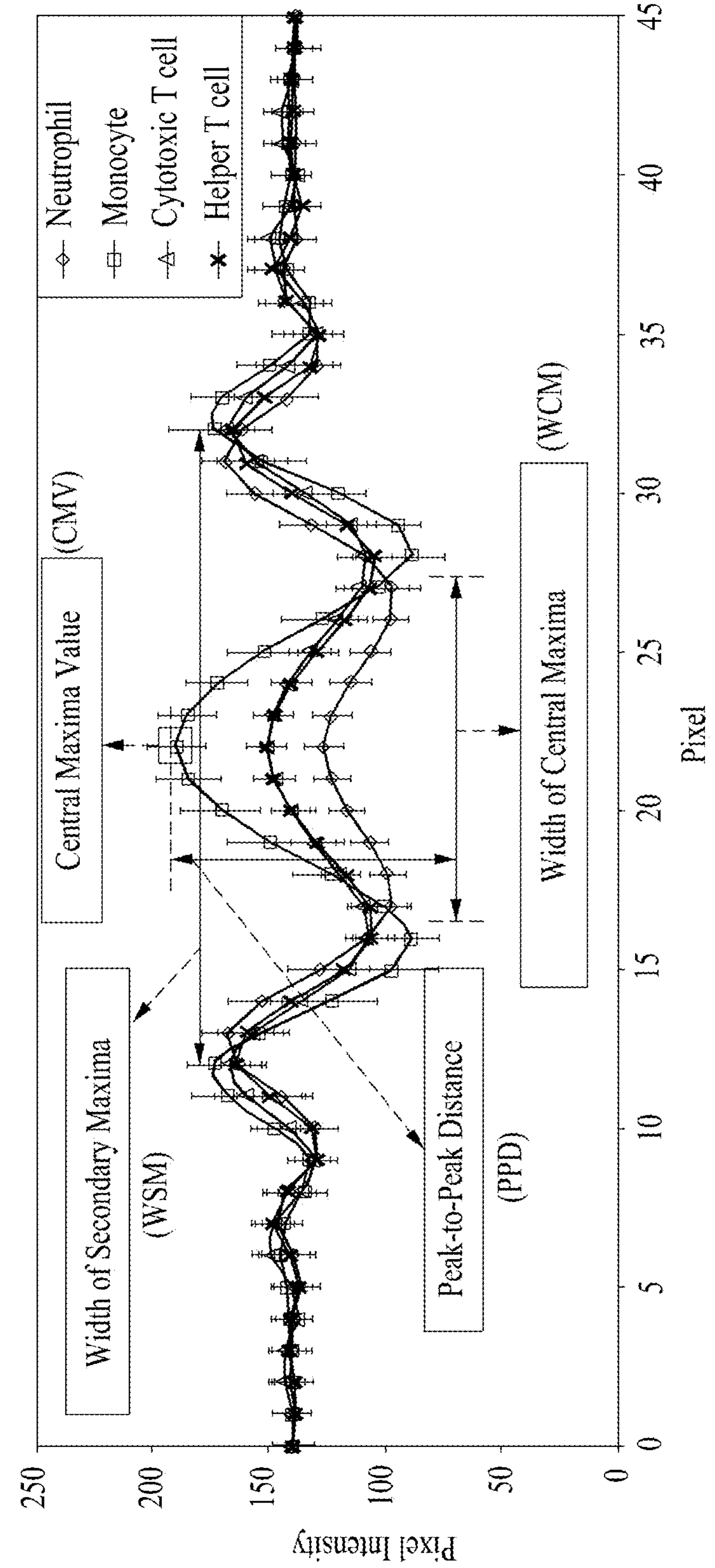
FIG. 6 is a graph for describing various shadow parameters that were obtained from a lens-free shadow image of NK cells, which was photographed by the apparatus for analyzing the activity of NK cells according to various embodiments.

FIG. 6 is a graph for describing various shadow parameters that were obtained from a lens-free shadow image of NK cells, which was photographed by the apparatus 100 for analyzing the activity of NK cells according to various embodiments.

Referring to FIG. 6, a cross section of a lens-free shadow image of each NK cell is represented as a two-dimensional graph. That is, as in (a), (b), or (c) of FIG. 5, a cross section of a shadow image is represented as a two-dimensional graph. In this case, in the lens-free shadow image, various shadow parameters essentially associated with the activity of an NK cell are defined. Specifically, the shadow parameters include a peak-to-peak distance (PPD), the width of secondary maxima (WSM), a standard deviation of WSM (WSM_SD), and minima of WSM (WSM_Min). The PPD indicates a distance between the peaks of NK cells in a lens-free shadow image. The WSM indicates a width having maximum brightness of a region having a predetermined number of pixels as a radius from a center point. The WSM_SD indicates a standard deviation of the WSM. The WSM_Min indicates a minimum value of the WSM. The apparatus 100 or analyzing the activity of an NK cell analyzes whether an NK has been activated or a degree of the activity of an NK cell by using at least one of the shadow parameters.

FIGS. 7A, 7B, 7C, and 7D are graphs for describing performance of the apparatus 100 for analyzing the activity of NK cells according to various embodiments.

Figure 7A:
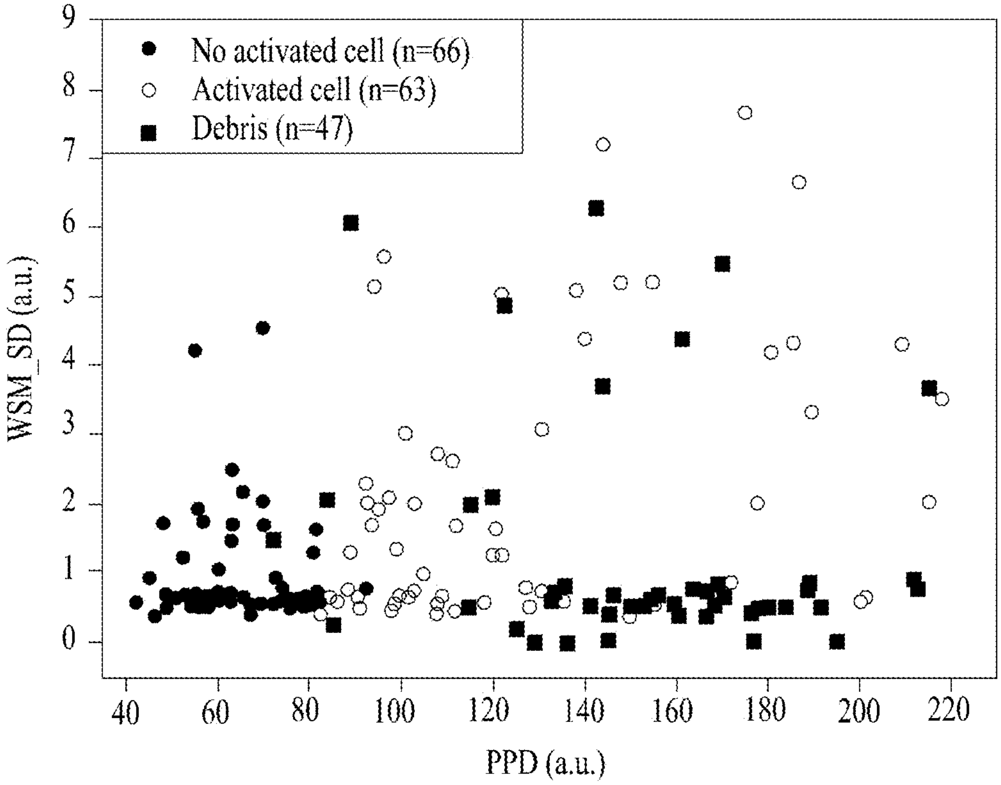
FIGS. 7A, 7B, 7C, and 7D are graphs for describing performance of the apparatus for analyzing the activity of NK cells according to various embodiments.
Figure 7B:
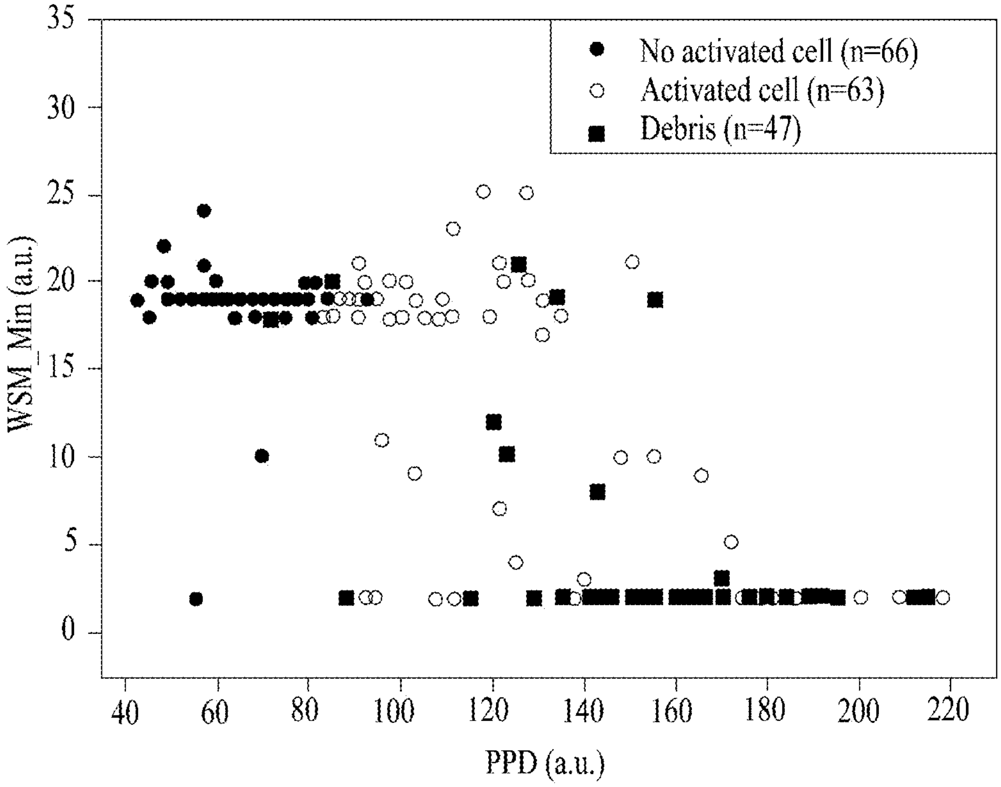
Figure 7C:
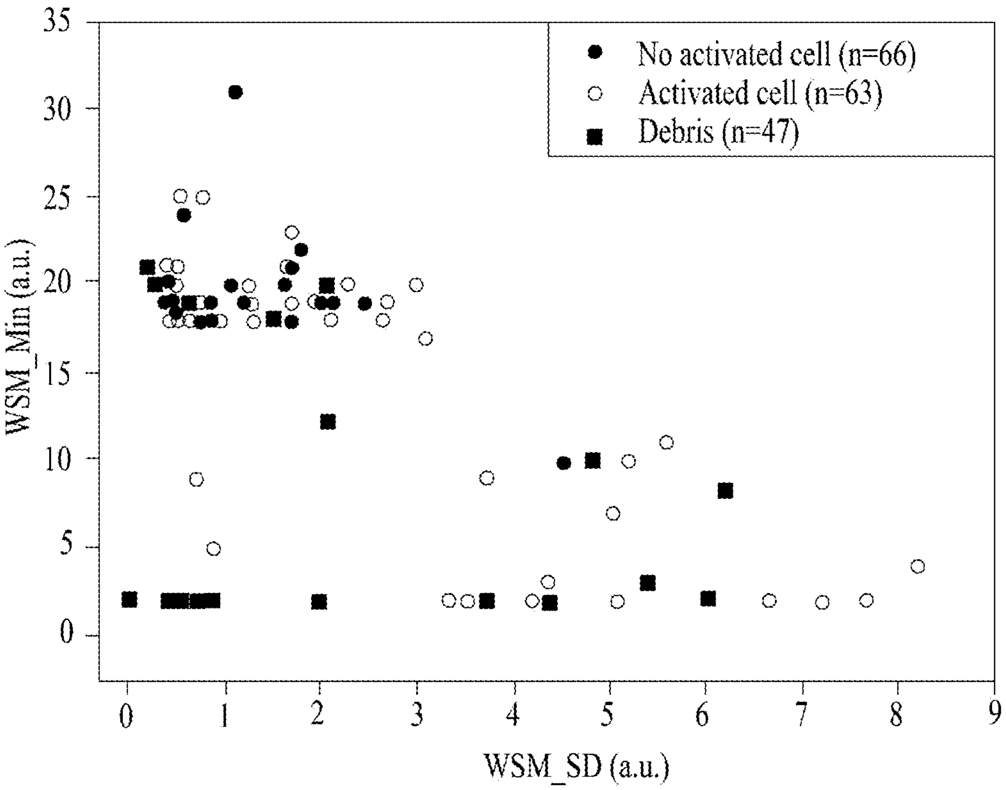
Figure 7D:
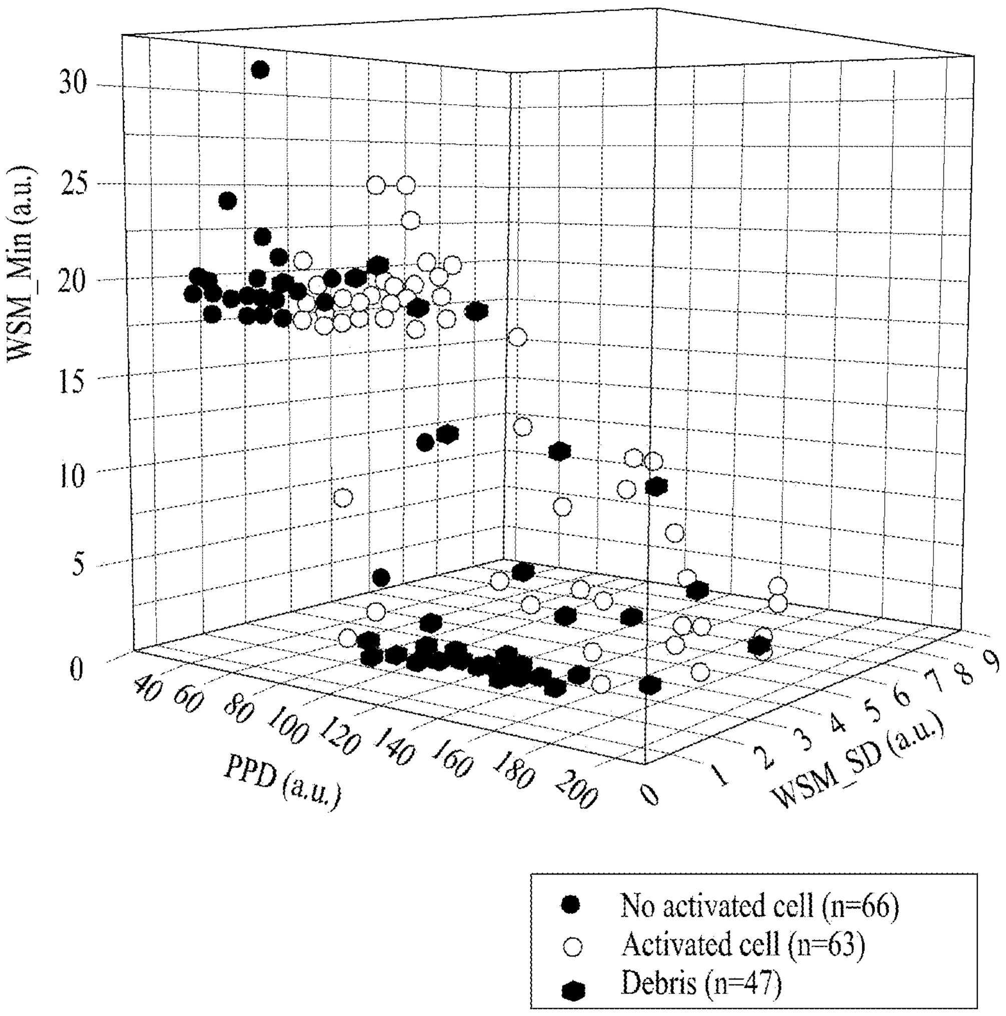

FIGS. 7A, 7B, 7C, and 7D visually illustrate distinction detection performance of an NK cell not activated (No activated cell), an activated NK cell, and debris according to at least one of the shadow parameters. FIG. 7A illustrates distinction detection results using the PPD and the WSM_SD. FIG. 7B illustrates distinction detection results using the PPD and the WSM_Min. FIG. 7C illustrates distinction detection results using the WSM_SD and the WSM_Min. FIG. 7D indicates three-dimensional distinction detection results using the PPD, the WSM_SD, and the WSM_Min. As illustrated in FIGS. 7*a*, 7*b*, 7*c*, and 7*d*, if at least one of the shadow parameters is used, whether an NK cell has been activated or a degree that the NK cell has been activated can be calculated for each cell in an environment including debris.

Figure 8:
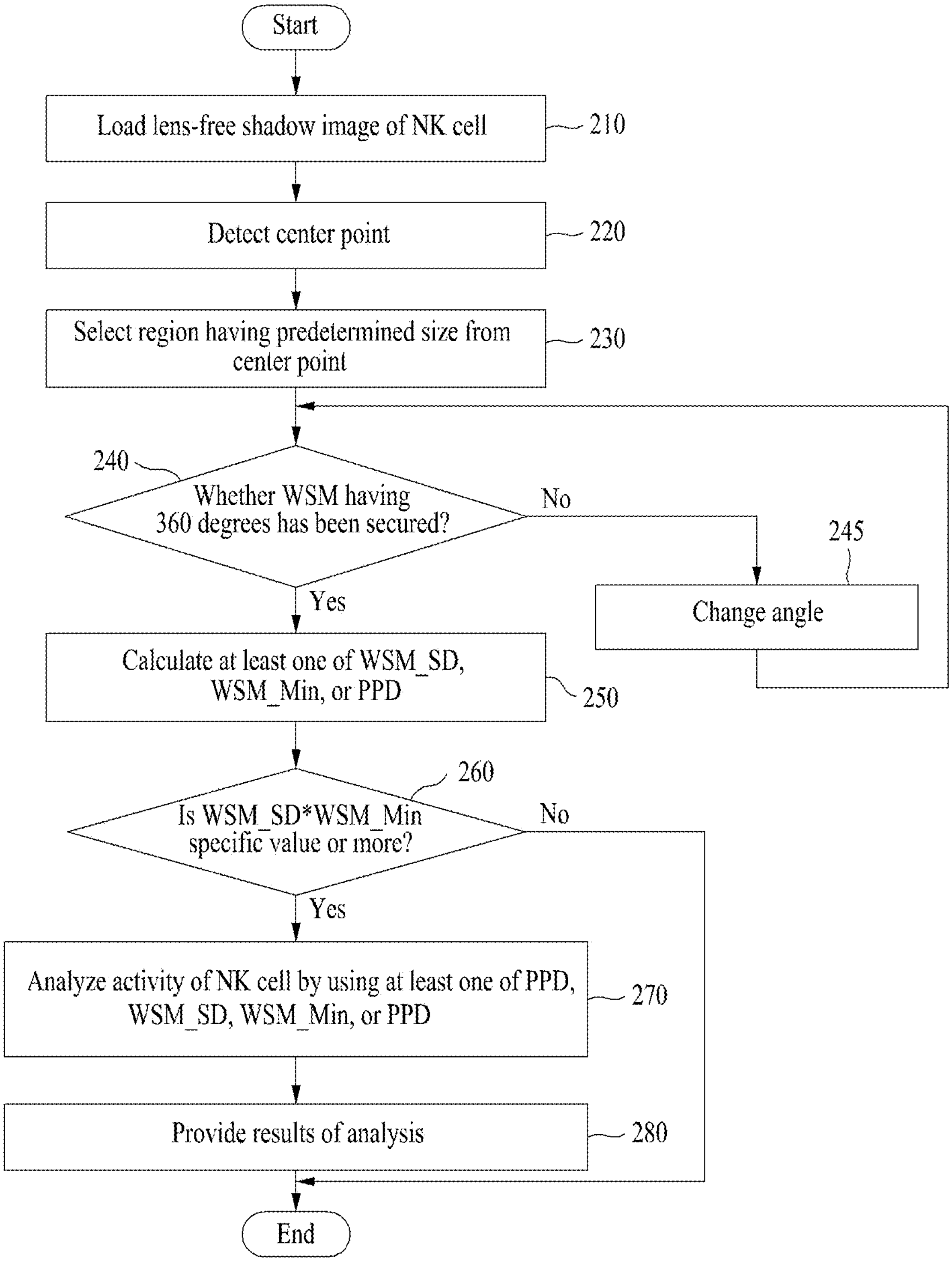
FIG. 8 is a flowchart illustrating a method of the apparatus for analyzing the activity of NK cells according to various embodiments.

FIG. 8 is a flowchart illustrating a method of the apparatus 100 for analyzing the activity of NK cells according to various embodiments. In this case, FIG. 8 illustrates an operating procedure of the NK cell activity analysis-dedicated algorithm for finally calculating the activity of an NK cell.

Referring to FIG. 8, in step 210, as a lens-free shadow image of an NK cell is loaded, the NK cell activity analysis-dedicated algorithm detects the lens-free shadow image. In response thereto, in step 220, the NK cell activity analysis-dedicated algorithm detects the center point of the NK cell in the lens-free shadow image. Furthermore, in step 230, the NK cell activity analysis-dedicated algorithm selects a region having a predetermined size from the center point in the lens-free shadow. In this case, the corresponding region indicates a pixel region having a predetermined number of pixels as a radius from the center point.

Next, in step 240, the NK cell activity analysis-dedicated algorithm determines whether WSM having 360 degrees has been secured with respect to the corresponding region. If it is determined that the WSM having 360 degrees has not been secured in step 240, in step 245, the NK cell activity analysis-dedicated algorithm changes an angle. Thereafter, the NK cell activity analysis-dedicated algorithm returns to step 240 and determines whether WSM having 360 degrees has been secured again. That is, the NK cell activity analysis-dedicated algorithm repeats steps 240 and 245 until it is determined that the WSM having 360 degrees has been secured in step 240. Specifically, the NK cell activity analysis-dedicated algorithm generates a virtual line in the predetermined number of pixels on the right side of the center point, rotates the virtual line n degrees by using its function, selects a predetermined number of pixels on the same line as the virtual line that has been rotated n degrees, derives second WSM, and secures 360/n WSMs while rotating the virtual line 360 degrees by repeating such a process 360/n times. For example, n is 15.

If it is determined that the WSM having 360 degrees has been secured in step 240, in step 250, the NK cell activity analysis-dedicated algorithm calculate at least one of WSM_SD, WSM_Min, or a PPD. Furthermore, in step 260, the NK cell activity analysis-dedicated algorithm determines whether the product (WSM_SD*WSM_Min) of the WSM_SD and the WSM_Min is a specific value or more.

If it is determined that the product (WSM_SD*WSM_Min) of the WSM_SD and the WSM_Min is the specific value or more in step 260, in step 270, the NK cell activity analysis-dedicated algorithm analyzes the activity of the NK cell by using at least one of the PPD, the WSM, the WSM_SD, or the WSM_Min. Accordingly, in step 280, the NK cell activity analysis-dedicated algorithm provides the results of the analysis. That is, the NK cell activity analysis-dedicated algorithm reports a value indicative of whether the NK cell has been activated or a degree of the activity of the NK cell.

Meanwhile, if it is determined that the product (WSM_SD*WSM_Min) of the WSM_SD and the WSM_Min is less than the specific value in step 260, the NK cell activity analysis-dedicated algorithm does not analyze the activity of the NK cell.

FIGS. 9A, 9B, 9C, 9D, 9E, and 9F are diagrams for comparing and describing the results of analysis according to the method of the apparatus 100 for analyzing the activity of NK cells according to various embodiments and the results of analysis according to the existing measurement method.

Figure 9A:
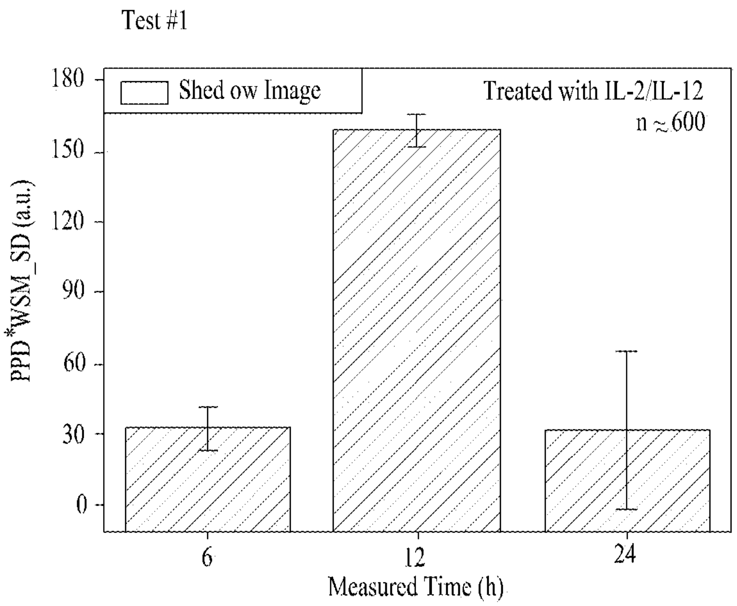
FIGS. 9A, 9B, 9C, 9D, 9E, and 9F are diagrams for comparing and describing the results of analysis according to the method of the apparatus for analyzing the activity of NK cells according to various embodiments and the results of analysis according to the existing measurement method.
Figure 9B:
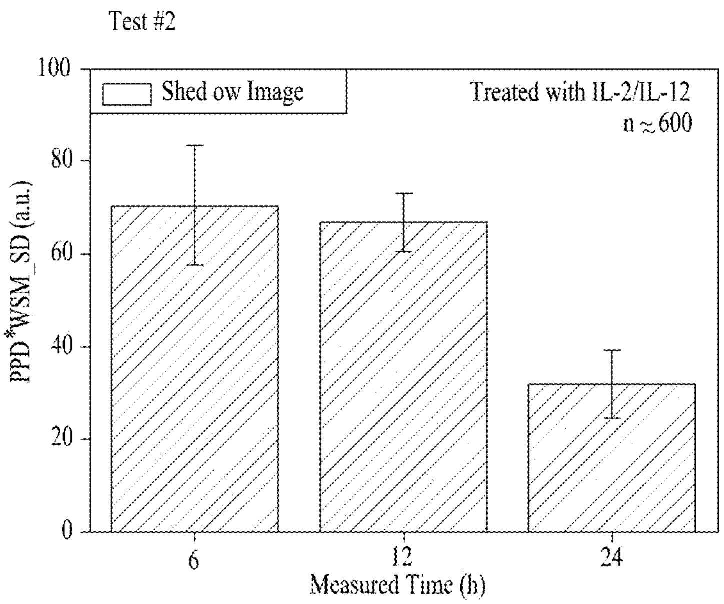
Figure 9C:
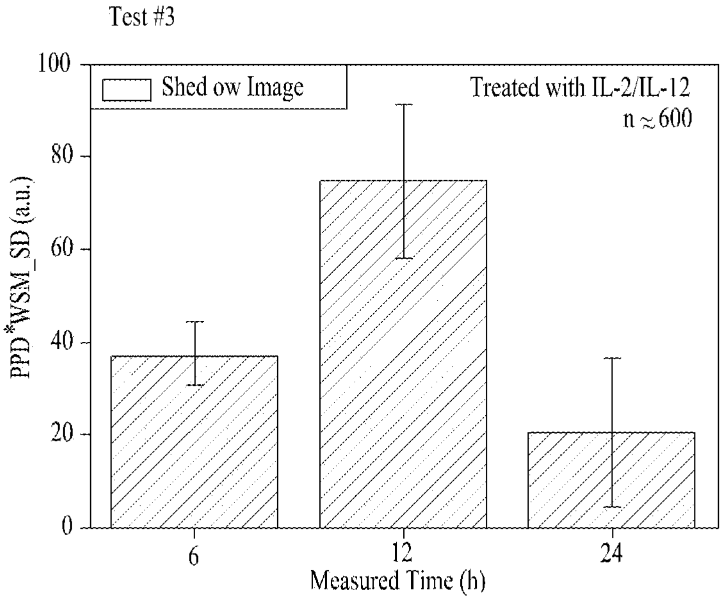
Figure 9D:
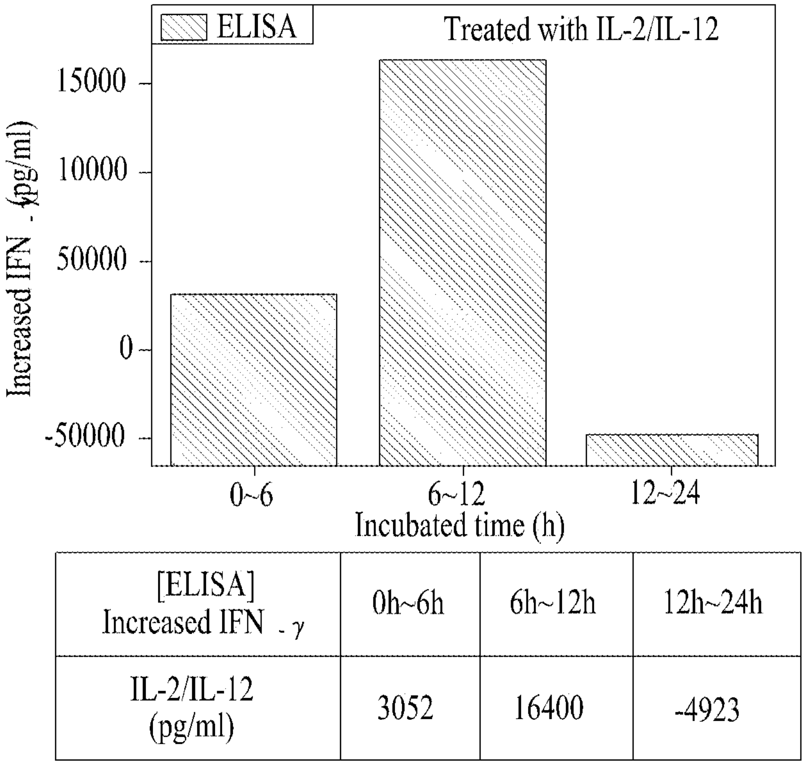
Figure 9E:
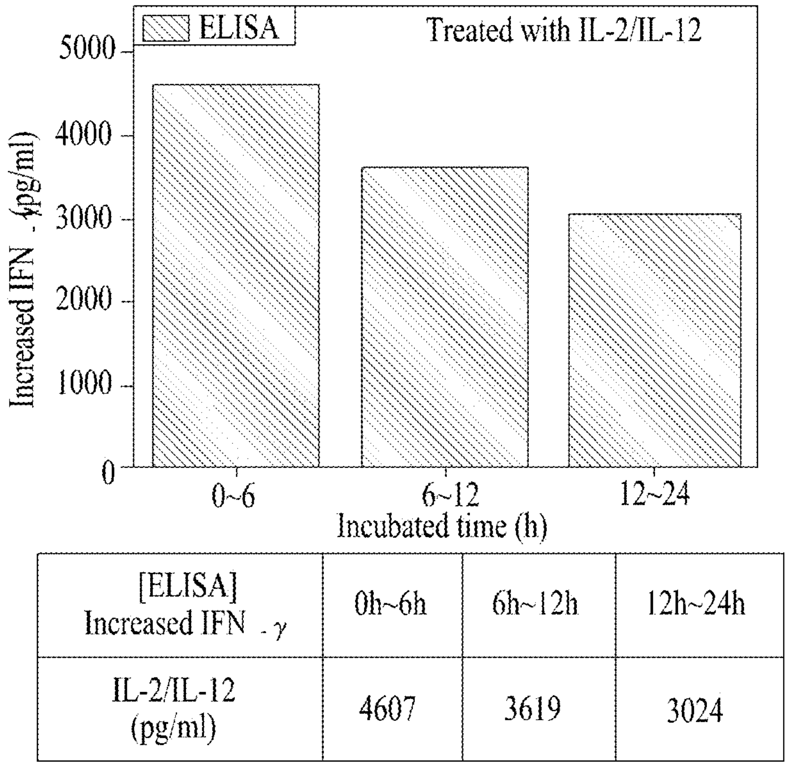
Figure 9F:
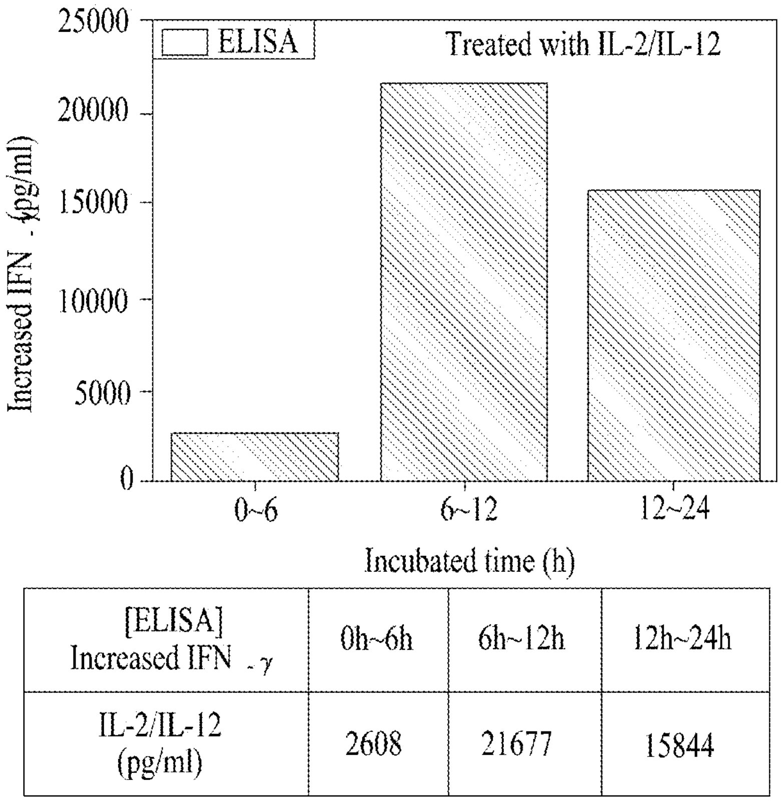

FIGS. 9A, 9B, 9C, 9D, 9E, and 9F illustrate the results of analysis of the activity of an NK cell that was activated after IL_2/IL_12 was input and the NK cell was cultivated after 6, 12, and 24 hours. FIGS. 9A, 9B, and 9C illustrate the results of analysis according to the method of the apparatus 100 for analyzing the activity of NK cells according to various embodiments. FIGS. 9D, 9E, and 9F illustrate the results of analysis according to ELISA, that is, the existing measurement method. The results of the analysis according to the method of the apparatus 100 for analyzing the activity of NK cells according to various embodiments and the results of the analysis according to ELSA show a very similar tendency. However, in the case of the results of the analysis according to ELISA, IL_2/IL_12 that was input in order to activate the NK cell accelerated the secretion of IFN-γ, and the amount of IFN-γ was accumulated detected over time. In contrast, the results of the analysis according to the method of the apparatus 100 for analyzing the activity of NK cells according to various embodiments were indicated as an increment of IFN-γ for each hour in a way to detect morphological changes in the NK cell by using the shadow parameters and a combination of them in specific hours after IL_2/IL_12 was input.

According to the detailed contents and results described above in order to implement various embodiments, if the lens-free shadow imaging technique that is presented in various embodiments is used, an ordinary person can provide immunity diagnosis information by quantizing the activity of an NK cell rapidly and cheaply through the NK cell-dedicated algorithm that is responsible for detecting morphological changes in the NK cell even without using a method that requires an expert and a lot of time and costs, such as the existing ELISA. In particular, various embodiments may enable patient-customized immunity diagnosis because they can provide information on both the number of NK cells and the activity of the NK cell, which are not possible through the existing technique.

Various embodiments provide the apparatus 100 for analyzing the activity of NK cells by using the lens-free shadow imaging technique and a method thereof.

The apparatus 100 for analyzing the activity of NK cells according to various embodiments includes the cell chip 110 in which an NK cell is disposed, the LED 120 configured to radiate light to the NK cell, the CMOS image sensor 130 configured to photograph a lens-free shadow image of the NK cell, and the processor 140 including the dedicated algorithm configured to analyze the activity of the NK cell based on the lens-free shadow image.

According to various embodiments, the dedicated algorithm detects at least one shadow parameter in at least some region of the lens-free shadow image and analyzes the activity of the NK cell by using the shadow parameter.

According to various embodiments, the shadow parameter includes at least one of a peak-to-peak distance (PPD) indicative of a distance between peaks in the region, the width of secondary maxima (WSM) indicative of the width having maximum brightness in the region, a standard deviation of WSM (WSM_SD) indicative of a standard deviation of the WSM, or minima of WSM (WSM_Min) indicative of a minimum value of the WSM.

According to various embodiments, the dedicated algorithm detects a center point of the NK cell in the lens-free shadow image, secures the WSM of the at least some region determined based on the center point in the lens-free shadow image, and calculates at least one of the WSM_SD, the WSM_Min, or the PPD in the region.

According to various embodiments, the dedicated algorithm analyzes the activity by using at least one of the PPD, the WSM, the WSM_SD, or the WSM_Min when a product of the WSM_SD and the WSM_Min is a predetermined value or more.

According to various embodiments, the dedicated algorithm generates a virtual line in a predetermined number of pixels in one direction at the center point, and secures the WSM having 360 degrees with respect to the region by repeatedly obtaining the WSM from the pixels on the line by rotating the line at a predetermined angle.

According to various embodiments, the dedicated algorithm analyzes the NK cell without using a reagent.

According to various embodiments, the dedicated algorithm analyzes the NK cell according to an automated image analysis technique.

A method of the apparatus 100 for analyzing the activity of NK cells according to various embodiments includes steps of detecting at least one shadow parameter in at least some region of a lens-free shadow image of an NK cell, and analyzing the activity of the NK cell by using the shadow parameter.

According to various embodiments, the shadow parameter includes at least one of a peak-to-peak distance (PPD) indicative of a distance between peaks in the region, the width of secondary maxima (WSM) indicative of the width having maximum brightness in the region, a standard deviation of WSM (WSM_SD) indicative of a standard deviation of the WSM, or minima of WSM (WSM_Min) indicative of a minimum value of the WSM.

According to various embodiments, the step of detecting the shadow parameter includes steps of detecting a center point of the NK cell in the lens-free shadow image, securing the WSM of some region that is determined from the center point in the lens-free shadow image, and calculating at least one of the WSM_SD, the WSM_Min, or the PPD in the region.

According to various embodiments, the step of analyzing the activity of the NK cell includes a step of analyzing the activity by using at least one of the PPD, the WSM, the WSM_SD, or the WSM_Min when a product of the WSM_SD and the WSM_Min is a predetermined value or more.

According to various embodiments, the step of securing the WSM includes generating a virtual line in a predetermined number of pixels in one direction at the center point and securing the WSM having 360 degrees with respect to the region by repeatedly obtaining the WSM from the pixels on the line by rotating the line at a predetermined angle.

According to various embodiments, the method of the apparatus 100 for analyzing the activity of NK cells is performed by an NK cell activity analysis-dedicated algorithm mounted on the apparatus 100 for analyzing the activity of NK cells.

According to various embodiments, the dedicated algorithm analyzes the NK cell without using a reagent.

According to various embodiments, the dedicated algorithm analyzes the NK cell according to an automated image analysis technique.

The aforementioned method may be provided as a computer program recorded on a computer-readable recording medium in order to be executed in a computer. The medium may continue to store a program executable by a computer or may temporarily store the program for execution or download. Furthermore, the medium may be various recording means or storage means having a form in which one or a plurality of pieces of hardware has been combined. The medium is not limited to a medium that is directly connected to a computer system, but may be ones that are distributed and present in a network. Examples of the medium may be magnetic media such as a hard disk, a floppy disk, and a magnetic tape, optical media such as CD-ROM and a DVD, magneto-optical media such as a floptical disk, and media configured to store a program command, including, ROM, RAM, and flash memory. Furthermore, examples of another medium may include recording media and/or storage media managed in an app store in which apps are distributed, a site in which various other pieces of software are supplied or distributed, a server, etc.

The methods, operations or schemes of this disclosure may be implemented by various means. For example, such schemes may be implemented as hardware, firmware, software, or a combination of them. Those skilled in the art will understand that various exemplary logical blocks, modules, circuits, and algorithm steps described in association with the present disclosure may be implemented as electronic hardware, computer software, or combinations of them. In order to clearly describe such a mutual substitution of hardware and software, various exemplary components, blocks, modules, circuits, and steps have been generally described above from their functional viewpoints. Whether such a function is implemented as hardware or implemented as software is different depending on design requirements assigned to a specific application and the entire system. Those skilled in the art may implement a function described in various manners for each specific application, but such implementations should not be construed as departing from the scope of this disclosure.

In a hardware implementation, processing units used to perform schemes may be implemented within one or more ASICs, DSPs, digital signal processing devices (DSPDs), programmable logic devices (PLDs), field programmable gate arrays (FPGAs), processors, controllers, microcontrollers, micro processors, electronic devices, other electronic units designed to perform functions described in this disclosure, a computer, or a combination of them.

Accordingly, various exemplary logical blocks, modules, and circuits described in association with this disclosure may be implemented or performed as a general-purpose processor, a DSP, an ASIC, an FPGA or another programmable logical device, a discrete gate or transistor logic, discrete hardware components or a given combination of them designed to perform functions described in the present disclosure. The general-purpose processor may be a microprocessor, but alternatively, the processor may be a given conventional processor, controller, microcontroller, or state machine. Furthermore, the processor may be implemented as a combination of computing devices, for example, a DSP and a microprocessor, a plurality of microprocessors, one or more microprocessors associated with a DSP core, or a combination of given other components.

In firmware and/or software implementation, schemes may be implemented as instructions stored in a computer-readable recording medium, such as random access memory (RAM), a read-only memory (ROM), a non-volatile random access memory (NVRAM), a programmable read-only memory (PROM), an erasable programmable read-only memory (EPROM), an electrically erasable PROM (EE-PROM), flash memory, a compact disc (CD), a magnetic or optical data storage device. The instructions may be executed by one or more processors and may enable a processor(s) to perform specific aspects of a function described in this disclosure.

The aforementioned embodiments have been described as using aspects of the subject matter now disclosed in one or more independent computer systems, but this disclosure is not limited thereto and may be implemented in association with a network or a given computing environment, such as a distributed computing environment.

Furthermore, in this disclosure, aspects of the subject matter may be implemented in a plurality of processing chips or devices, and storage may be similarly influenced in a plurality of devices. Such devices may include PCs, network servers, and portable devices.

Although this disclosure has been described in relation to some embodiments, the disclosure may be modified and changed in various ways without departing from the scope of this disclosure which may be understood by those skilled in the art to which an invention of this disclosure belongs. Furthermore, such a modification and change should be considered as belonging to the scope of the claims appended in the specification.

The invention claimed is:

1. An apparatus for analyzing an activity of natural killer (NK) cells by using a lens-free shadow imaging technique, the apparatus comprising: a cell chip in which an NK cell is disposed; an LED configured to radiate light to the NK cell; a CMOS image sensor configured to photograph a lens-free shadow image of the NK cell; and a processor comprising a dedicated algorithm configured to analyze an activity of the NK cell based on the lens-free shadow image, wherein the dedicated algorithm detects at least one shadow parameter in at least some region of the lens-free shadow image and analyzes the activity of the NK cell by using the shadow parameter, and the shadow parameter comprises at least one of a peak-to-peak distance (PPD) indicative of a distance between peaks in the region, a width of secondary maxima (WSM) indicative of a width having maximum brightness in the region, a standard deviation of WSM (WSM_SD) indicative of a standard deviation of the WSM, or minima of WSM (WSM_Min) indicative of a minimum value of the WSM, and wherein the dedicated algorithm detects a center point of the NK cell in the lens-free shadow image, secures the WSM of the at least some region determined from the center point in the lens-free shadow image, and calculates at least one of the WSM_SD, the WSM_Min, or the PPD in the region.

2. The apparatus of claim 1, wherein the dedicated algorithm analyzes the activity by using at least one of the PPD, the WSM, the WSM_SD, or the WSM_Min when a product of the WSM_SD and the WSM_Min is a predetermined value or more.

3. The apparatus of claim 1, wherein the dedicated algorithm generates a virtual line in a predetermined number of pixels in one direction at the center point, and secures the WSM having 360 degrees with respect to the region by repeatedly obtaining the WSM from the pixels on the line by rotating the line at a predetermined angle.

4. The apparatus of claim 1, wherein the dedicated algorithm analyzes the NK cell without using a reagent.

5. The apparatus of claim 1, wherein the dedicated algorithm analyzes the NK cell according to an automated image analysis technique.

6. A method of using an apparatus for analyzing an activity of NK cells by using a lens-free shadow imaging technique, the method comprising: detecting at least one shadow parameter in at least some region of a lens-free shadow image of an NK cell and analyzing an activity of the NK cell by using the shadow parameter, wherein the shadow parameter comprises at least one of a peak-to-peak distance (PPD) indicative of a distance between peaks in the region, a width of secondary maxima (WSM) indicative of a width having maximum brightness in the region, a standard deviation of WSM (WSM_SD) indicative of a standard deviation of the WSM, or minima of WSM (WSM_Min) indicative of a minimum value of the WSM, wherein the detecting of the shadow parameter comprises: detecting a center point of the NK cell in the lens-free shadow image; securing the WSM of some region that is determined from the center point in the lens-free shadow image; and calculating at least one of the WSM_SD, the WSM_Min, or the PPD in the region, and wherein the securing of the WSM comprises: generating a virtual line in a predetermined number of pixels in one direction at the center point and securing the WSM having 360 degrees with respect to the region by repeatedly obtaining the WSM from the pixels on the line by rotating the line at a predetermined angle.

7. The method of claim 6, wherein: the method is performed by an NK cell activity analysis-dedicated algorithm that is executed by the apparatus for analyzing the activity of NK cells and wherein the dedicated algorithm analyzes the NK cell without using a reagent.

8. The method of claim 6, wherein: the method is performed by an NK cell activity analysis-dedicated algorithm that is executed by the apparatus for analyzing the activity of NK cells and wherein the dedicated algorithm analyzes the NK cell according to an automated image analysis technique.

9. A non-transitory computer-readable recording medium having encoded thereon instructions that, when executed by an apparatus, execute a method of using the apparatus for analyzing an activity of NK cells by using a lens-free shadow imaging technique, wherein the instructions comprise instructions for detecting at least one shadow parameter in at least some region of a lens-free shadow image of an NK cell and analyzing an activity of the NK cell by using the shadow parameter, wherein the shadow parameter comprises at least one of a peak-to-peak distance (PPD) indicative of a distance between peaks in the region, a width of secondary maxima (WSM) indicative of a width having maximum brightness in the region, a standard deviation of WSM (WSM_SD) indicative of a standard deviation of the WSM, and minima of WSM (WSM_Min) indicative of a minimum value of the WSM, wherein the instructions for detecting the shadow parameter comprise: instructions for detecting a center point of the NK cell in the lens-free shadow image; instructions for securing the WSM of some region that is determined from the center point in the lens-free shadow image; and instructions for calculating at least one of the WSM_SD, the WSM_Min and the PPD in the region, and wherein the instructions for securing of the WSM comprise instructions for generating a virtual line in a predetermined number of pixels in one direction at the center point and securing the WSM having 360 degrees with respect to the region by repeatedly obtaining the WSM from the pixels on the line by rotating the line at a predetermined angle.

* * * * *